US011549447B2

(12) United States Patent
De Later et al.

(10) Patent No.: US 11,549,447 B2
(45) Date of Patent: Jan. 10, 2023

(54) FUEL/AIR SUPPLY DEVICE

(71) Applicant: Micro Turbine Technology B.V., Eindhoven (NL)

(72) Inventors: Marco De Later, Herkenbosch (NL); Victor Kornilov, Geldrop (NL); Paul Smeets, Tilburg (NL); Ilian Doutchev, The Hague (NL)

(73) Assignee: Micro Turbine Technology B.V., Eindhoven (NL)

( * ) Notice: Subject to any disclaimer, the term of this patent is extended or adjusted under 35 U.S.C. 154(b) by 0 days.

(21) Appl. No.: 17/269,127

(22) PCT Filed: Aug. 19, 2019

(86) PCT No.: PCT/NL2019/050537
§ 371 (c)(1),
(2) Date: Feb. 17, 2021

(87) PCT Pub. No.: WO2020/040637
PCT Pub. Date: Feb. 27, 2020

(65) Prior Publication Data
US 2021/0324806 A1  Oct. 21, 2021

(30) Foreign Application Priority Data

Aug. 20, 2018  (NL) .................................. NL2021484

(51) Int. Cl.
*F02C 9/40*  (2006.01)
*F02C 7/10*  (2006.01)
(Continued)

(52) U.S. Cl.
CPC .................. *F02C 9/40* (2013.01); *F02C 3/22* (2013.01); *F02C 3/30* (2013.01); *F02C 7/10* (2013.01);
(Continued)

(58) Field of Classification Search
CPC ...... F02C 3/22; F02C 3/30; F02C 7/10; F02C 7/22; F02C 9/18; F02C 9/40; F02C 9/50; F02C 9/52
See application file for complete search history.

(56) References Cited

U.S. PATENT DOCUMENTS 2,745,251 A  *  5/1956  Schirmer  .............. F02C 7/2365
60/39.27
3,161,020 A  *  12/1964  La Haye  ................. F02C 7/236
48/190
(Continued)

FOREIGN PATENT DOCUMENTS

| EP | 1128039 A2 | 8/2001 |
| EP | 2299178 | 3/2011 |
| GB | 1123921 | 8/1968 |

OTHER PUBLICATIONS

Search Report and Written Opinion from Application No. PCT/NL2019/050537 dated Jan. 28, 2020 (9 pages).
(Continued)

*Primary Examiner* — Alain Chau
(74) *Attorney, Agent, or Firm* — Troutman Pepper Hamilton Sanders LLP; Ryan A. Schneider

(57) ABSTRACT

A fuel/air supply device including a fuel supply arrangement designed to convey fuel to a fuel outlet of the fuel/air supply device, a primary air supply arrangement designed to convey air to an air outlet of the fuel/air supply device, and a secondary air supply arrangement connecting the primary air supply arrangement to the fuel supply arrangement at a position upstream of a fuel compressor that is included in the fuel supply arrangement. The secondary air supply arrangement includes an air conduit that has a restricted portion for defining a relatively small air passage in the air conduit, and can be used for realizing a fuel/air mixture of low calorific (Continued)

value if so desired on the basis of a supply of air to the fuel without needing complex control measures.

19 Claims, 1 Drawing Sheet

(51) Int. Cl.
  *F02C 3/30* (2006.01)
  *F02C 3/22* (2006.01)
(52) U.S. Cl.
  CPC ...... *F05D 2220/32* (2013.01); *F05D 2240/35* (2013.01); *F05D 2260/213* (2013.01)

(56) References Cited

U.S. PATENT DOCUMENTS

| | | | | |
|---|---|---|---|---|
| 8,499,620 | B2* | 8/2013 | Sako | F23N 1/00 73/64.41 |
| 9,097,188 | B2* | 8/2015 | Tanabe | F02C 9/40 |
| 9,464,576 | B2* | 10/2016 | Zhang | F02C 3/04 |
| 10,584,645 | B2* | 3/2020 | Nakagawa | F02C 9/42 |
| 2008/0187789 | A1* | 8/2008 | Ghezel-Ayagh | H01M 8/04164 429/513 |
| 2009/0158701 | A1* | 6/2009 | Hoffmann | F02C 3/22 60/39.12 |
| 2009/0161398 | A1* | 6/2009 | Benaboud | H02M 5/4585 363/131 |
| 2010/0115952 | A1* | 5/2010 | Sako | F02C 7/22 73/1.01 |
| 2010/0229525 | A1* | 9/2010 | Mackay | F02C 7/08 60/39.511 |
| 2011/0083444 | A1* | 4/2011 | Bathina | F02C 7/22 60/776 |
| 2011/0167783 | A1* | 7/2011 | Tanabe | F02C 7/236 60/737 |
| 2013/0232939 | A1* | 9/2013 | Armstrong | B01J 8/062 60/39.23 |
| 2013/0232947 | A1* | 9/2013 | Armstrong | F23G 7/066 110/211 |
| 2013/0232982 | A1* | 9/2013 | Maslov | F23G 5/46 431/12 |
| 2013/0255271 | A1* | 10/2013 | Yu | F02C 3/22 60/776 |
| 2014/0238039 | A1* | 8/2014 | Zhang | F02C 7/22 60/436 |
| 2017/0009664 | A1* | 1/2017 | Nakagawa | F02C 6/02 |

OTHER PUBLICATIONS

Search Report from Netherlands Application 2021484 dated Apr. 12, 2019 (8 pages).

* cited by examiner

FUEL/AIR SUPPLY DEVICE

CROSS-REFERENCE TO RELATED APPLICATIONS

This application is a § 371 national stage of International Application PCT/NL2019/050537, with an international filing date of 19 Aug. 2019, which International Application claims the benefit of NL 2021484, filed on 20 Aug. 2018, the benefit of the earlier filing date of which is hereby claimed under 35 USC § 119(a)-(d) and (f). The entire contents and substance of all applications are hereby incorporated by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

The invention relates to a fuel/air supply device comprising a fuel supply arrangement designed to convey fuel from a fuel inlet of the fuel/air supply device to a fuel outlet of the fuel/air supply device, and an air supply arrangement designed to convey air from an air inlet of the fuel/air supply device to an air outlet of the fuel/air supply device.

The invention further relates to a fuel combustion arrangement, comprising a combustor designed to combust fuel and a fuel/air supply device as mentioned.

The invention also relates to a method of controlling an effective calorific value of a fuel/air mixture to be output from a fuel/air supply device as mentioned.

The invention is applicable in various fields, including the field of gas turbine arrangements. In a general sense, a gas turbine arrangement is an example of a fuel combustion arrangement as mentioned in the foregoing, comprising a combustor designed to combust fuel such as natural gas and a device for supplying the fuel and also air to the combustor. In the following, the invention is explained in the context of micro gas turbine arrangements, which does not alter the fact that the invention is applicable to gas turbine arrangements in general and to other contexts of a supply of fuel and air.

2. Description of Related Art

A possible application of micro gas turbine arrangements is an application for Combined Heat & Power (CHP), which does not alter the fact that other applications are feasible as well. Micro gas turbine arrangements may be used instead of conventional boilers in large houses, offices, plants, schools, stores etc., to mention one example, or may be used in hybrid electric vehicles so as to extend the range of such vehicles, to mention another example. In general, micro gas turbine arrangements are known for high reliability, low maintenance demand and low noise level, combined with high electric efficiency, low weight and low emissions.

A micro gas turbine typically comprises a compressor, a combustor and a turbine. During operation of a micro gas turbine, ambient air is drawn in and pressurized by the compressor. The compressed air is supplied to a combustor generating hot gas on the basis of combustion of a fuel that is supplied to the combustor as well, which is normally a gas fuel such as natural gas. It is common practice to have a special type of heat exchanger called recuperator in a micro gas turbine arrangement, which in that case serves for pre-heating the air before being supplied to the combustor. From the combustor, the hot pressurized gas is supplied to the turbine where it expands and thereby provides mechanical power for both the compressor and a generator that is mechanically coupled to the turbine.

The mechanical power of the generator is used to generate electric power as a first type of output from the micro gas turbine arrangement. For the purpose of conveying the electric power to an electric power grid, the micro gas turbine arrangement is equipped with a suitable grid converter.

The expanded gas, i.e. the exhaust gas from the turbine, may be made to flow through a recuperator, as mentioned, in which case heat from the exhaust gas is used for pre-heating air compressed by the compressor, prior to supplying the air to the combustor. Further, it is possible for a micro gas turbine arrangement to comprise a gas-to-liquid heat exchanger, which in that case may be used for heating water, for example, so that hot water is obtained as a second type of output from the micro gas turbine arrangement. As an alternative, ambient air from an air heating system can be heated by using an air handler, in case forced air heating is used in a building, as is often the case in North America.

It is a generally known fact that different types of gas fuel having different calorific values exist, and also that combustion of gas fuels which are categorized as being gas fuels having a high calorific value yields more emission gases which are harmful to the environment, particularly nitrogen oxides ($NO_x$), than combustion of gas fuels which are categorized as being gas fuels having a low calorific value. Further, it is a generally known fact that the design of gas fuel combustion arrangements is normally aimed at enabling the arrangement to handle one of high calorific gas fuels and low calorific gas fuels. Thus, a gas fuel combustion arrangement designed to handle high calorific gas fuels is not suitable for handling low calorific gas fuels, and it may even be so that failure of such an arrangement occurs when low calorific gas fuels are supplied to the arrangement. Likewise, a gas fuel combustion arrangement designed to handle low calorific gas fuels is not suitable for handling high calorific gas fuels, and it may even be so that failure of such an arrangement occurs when high calorific gas fuels are input supplied to the arrangement.

BRIEF SUMMARY OF THE INVENTION

It is an object of the invention to provide a practical way of designing a fuel/air supply device so as to be capable of processing both low calorific fuels and high calorific fuels, without incurring high additional costs and without needing to amend a basic set-up of the fuel/air supply device with a fuel supply arrangement and an air supply arrangement as mentioned in the foregoing. This object is achieved by providing a fuel/air supply device with a further air supply arrangement, so that the fuel/air supply device is defined as comprising the following components:

a fuel supply arrangement designed to convey fuel from a fuel inlet of the fuel/air supply device to a fuel outlet of the fuel/air supply device, wherein the fuel supply arrangement comprises a fuel compressor designed to take in and pressurize fuel, a primary air supply arrangement designed to convey air from an air inlet of the fuel/air supply device to an air outlet of the fuel/air supply device, and a secondary air supply arrangement interconnecting the primary air supply arrangement and the fuel supply arrangement by connecting the primary air supply arrangement to the fuel supply arrangement at a position upstream of the fuel compressor, wherein the secondary air supply arrangement includes an air conduit that has a restricted portion at the position of which an area for allowing air to pass through the air conduit is relatively small in the air conduit.

According to the invention, a fuel/air supply device is provided with an additional air supply arrangement interconnecting the fuel supply arrangement and the primary arrangement for conveying air to the air outlet of the fuel/air supply device. In the present text, the additional air supply arrangement is referred to as secondary air supply arrangement. By having the secondary air supply arrangement, it is possible for the fuel/air supply device to be optimized for handling low calorific fuels and still be capable of handling high calorific fuels as well, and the same is applicable to larger arrangements in which the fuel/air supply device is to be applied. The fact is that by means of the secondary air supply arrangement, it is possible to supply air directly to the fuel supply arrangement, so that in case a high calorific fuel is present in the fuel supply arrangement, a fuel/air mixture of reduced effective calorific value can be obtained. The fuel/air supply device according to the invention may be of any practical design and may be configured to process any appropriate type of fuel. A practical example of an appropriate type of fuel is a gas fuel such as natural gas.

One of the insights on which the invention is based is the insight that it is advantageous to have a fuel/air supply device for use in a system that is optimized for operation with low calorific fuel and to have the possibility of realizing a low caloric fuel/air mixture comprising high caloric fuel and air by means of the fuel/air supply device when high caloric fuel is available at the fuel inlet of the fuel/air supply device, so that still the best way of operating the system can be realized and failure of the system can be avoided.

As defined in the foregoing, the fuel supply arrangement is designed to convey fuel from a fuel inlet of the fuel/air supply device to a fuel outlet of the fuel/air supply device. Advantageously, the fuel inlet of the fuel/air supply device is configured to be in communication with a source of fuel, and the fuel outlet of the fuel/air supply device is configured to be in communication with a position to which fuel is to be supplied, which position may comprise a fuel inlet of a combustor, for example. Further, it is defined that the primary air supply arrangement is designed to convey air from an air inlet of the fuel/air supply device to an air outlet of the fuel/air supply device. Advantageously, the air inlet of the fuel/air supply device is configured to be in communication with a source of air, which may be the environment of the fuel/air supply device where ambient air is present, for example, and the air outlet of the fuel/air supply device is configured to be in communication with a position to which air is to be supplied, which may comprise an air inlet of a combustor, for example.

In the fuel/air supply device according to the invention, the secondary air supply arrangement can be realized in an uncomplicated fashion and can do without any form of (electronic) control. In one embodiment, the air conduit of the secondary air supply arrangement can be equipped with a restriction element that is arranged at a suitable position inside the air conduit, wherein the restriction element has a narrow channel extending therethrough, and wherein an outer surface of the restriction element sealingly contacts an inner surface of the air conduit, so that an air flow through the air conduit is forced to flow through the narrow channel and cannot pass the restriction element at a position between the outer surface of the restriction element and the inner surface of the air conduit. The restriction element can easily be incorporated in the air conduit by dividing the air conduit in two portions and arranging the portions on the restriction element at either side of the restriction element. In a practical sense, the fact that at the position of the restricted portion of the air conduit, an area for allowing air to pass through the air conduit is relatively small in the air conduit may be understood so as to mean that the said area is relatively small with respect to the said area at the position of portions of the air conduit adjacent the restricted portion.

Assuming a pressure difference between the one side of the air conduit and the other during operation of the fuel/air supply device, wherein the lowest pressure is prevailing at the side of the fuel supply arrangement, it is achieved that most of the air is conveyed through the primary air supply arrangement, while a small fraction of the air is supplied directly to the fuel supply arrangement through the secondary air supply arrangement. The relation between the quantity of air flowing through the first air supply arrangement and the quantity of air flowing through the second air supply arrangement is more or less independent of the value of the pressure difference between the air intake side and the fuel intake side of the fuel/air supply device, as the mass flow through the secondary air supply arrangement automatically increases as the pressure difference increases, and automatically decreases as the pressure difference decreases. By allowing an air flow through the secondary air supply arrangement that is only a fraction of the air flow through the primary air supply arrangement, the actual, basic functionality of a larger arrangement that is equipped with the fuel/air supply device is hardly influenced, so that there is no need for any redesign actions of the larger arrangement.

In respect of the fuel outlet of the fuel/air supply device and the air outlet of the fuel/air supply device, it is noted that those outlets may be separate outlets in a structural sense, or combined, whatever is appropriate in view of intended use of the fuel/air supply device.

According to the invention, the fuel supply arrangement comprises a fuel compressor designed to take in and pressurize fuel, and the secondary air supply arrangement connects the primary air supply arrangement to the fuel supply arrangement at a position upstream of the fuel compressor, which is a position of lowest pressure in the fuel supply arrangement.

In a preferred embodiment, the fuel/air supply device according to the invention comprises a valve mechanism designed to be put in one of a position of blocking an air flow through the air conduit of the secondary air supply arrangement and a position of allowing an air flow through the air conduit of the secondary air supply arrangement. In that way, an operator can choose whether or not to activate the secondary air supply arrangement. In particular, an operator can choose to address the secondary air supply arrangement only when high calorific fuel is input to the fuel/air supply device.

It may be practical for a diameter of the restricted portion of the air conduit of the secondary air supply arrangement to be in a range of 5 to 20 times as small as a general diameter of the air conduit. Further, it may be so that the secondary air supply arrangement is designed to take a small fraction of an air flow in the primary air supply arrangement, wherein the air flow through the secondary air supply arrangement may be about 5% to 20% of the fuel volumetric flow. Depending on the specific design and intended application of the fuel/air supply device, different values may be chosen in respect of the relation of the diameters as mentioned and/or the relation of the flows as mentioned.

The primary air supply arrangement of the fuel/air supply device according to the invention may comprise an air compressor designed to take in and pressurize air. Pressurizing air at the air intake side of the fuel/air supply device contributes to creating the circumstances in which air flows from the air intake side to the fuel intake side are obtained, including an air flow through the restricted portion of the air conduit of the secondary air supply arrangement.

The invention further relates to a fuel combustion arrangement comprising a combustor designed to combust fuel and a fuel/air supply device as introduced in the foregoing, wherein the fuel supply arrangement of the fuel/air supply device is associated with the combustor and arranged to supply fuel to the combustor, and wherein the primary air supply arrangement of the fuel/air supply device is associated with the combustor and arranged to supply air to the combustor.

Although the air flow through the secondary air supply arrangement does not necessarily need to be controlled, it may be advantageous for the fuel combustion arrangement according to the invention to comprise a controller arrangement designed to control operation thereof, the controller arrangement particularly being configured to detect pressure of an air flow from the primary air supply arrangement to the combustor and to set a flow of fuel from the fuel supply arrangement to the combustor in dependency thereof by following an algorithm according to which the flow of fuel from the fuel supply arrangement to the combustor is set so as to be larger when the pressure of the air flow from the primary air supply arrangement to the combustor is higher and so as to be smaller when the pressure of the air flow from the primary air supply arrangement to the combustor is lower. Generally speaking, measures can be taken to keep the extent to which the fuel is mixed with air at a more or less constant level.

As suggested earlier, the fuel combustion arrangement according to the invention may be a gas turbine arrangement, in which case the fuel combustion arrangement may be a micro gas turbine arrangement. In the case of the fuel combustion arrangement according to the invention being a gas turbine arrangement, the combustor is designed to generate hot gas by combusting the fuel, and it may further be so that the fuel combustion arrangement comprises a turbine designed to take in and expand hot gas generated by the combustor, and a generator mechanically coupled to the turbine and designed to generate electric power on the basis of mechanical power. Other possible components of such a gas turbine arrangement include a grid converter designed to output electric power generated by the fuel combustion arrangement during operation thereof to an electric power grid, a heat exchanger being configured and arranged to serve as a recuperator for pre-heating air in the primary air supply arrangement before being supplied to the combustor by allowing the air to exchange heat with exhaust gas from the turbine, and a heat exchanger being configured and arranged to serve for heating an external medium by allowing the external medium to exchange heat with exhaust gas from the turbine.

The invention also relates to a method of controlling an effective calorific value of a fuel/air mixture to be output from a fuel/air supply device comprising a fuel supply arrangement that is designed to convey fuel from a fuel inlet of the fuel/air supply device to a fuel outlet of the fuel/air supply device, and that comprises a fuel compressor designed to take in and pressurize fuel, and the fuel/air supply device further comprising a primary air supply arrangement designed to convey air from an air inlet of the fuel/air supply device to an air outlet of the fuel/air supply device, the method involving taking a fraction of air flowing through the primary air supply arrangement and supplying the air directly to the fuel supply arrangement, particularly by using a secondary air supply arrangement that interconnects the primary air supply arrangement and the fuel supply arrangement by connecting the primary air supply arrangement to the fuel supply arrangement at a position upstream of the fuel compressor, and that includes an air conduit that has a restricted portion at the position of which an area for allowing air to pass through the air conduit is relatively small in the air conduit.

BRIEF DESCRIPTION OF THE DRAWINGS

The invention will be further elucidated on the basis of the following description of an example of a micro gas turbine arrangement that is designed to handle both low calorific gas fuel and high calorific gas fuel, and that is equipped with a fuel/air supply device that is configured to realize a low caloric fuel/air mixture comprising high caloric gas fuel and air when high caloric gas fuel is available at a fuel inlet of the fuel/air supply device. Reference will be made to the drawing, in which equal reference signs indicate equal or similar components, and in which.

The figures relate to a micro gas turbine arrangement 1 having features according to the invention, as will now be explained. The micro gas turbine arrangement 1 as shown and described represents only one example of many possible fuel combustion arrangements existing within the framework of the invention. In general, the invention is applicable in the field of energy conversion technologies covering combustion engines. A micro gas turbine arrangement is a practical example of a gas turbine arrangement which can be regarded as a specific type of combustion engine.

DETAILED DESCRIPTION OF THE INVENTION

Figure 1:
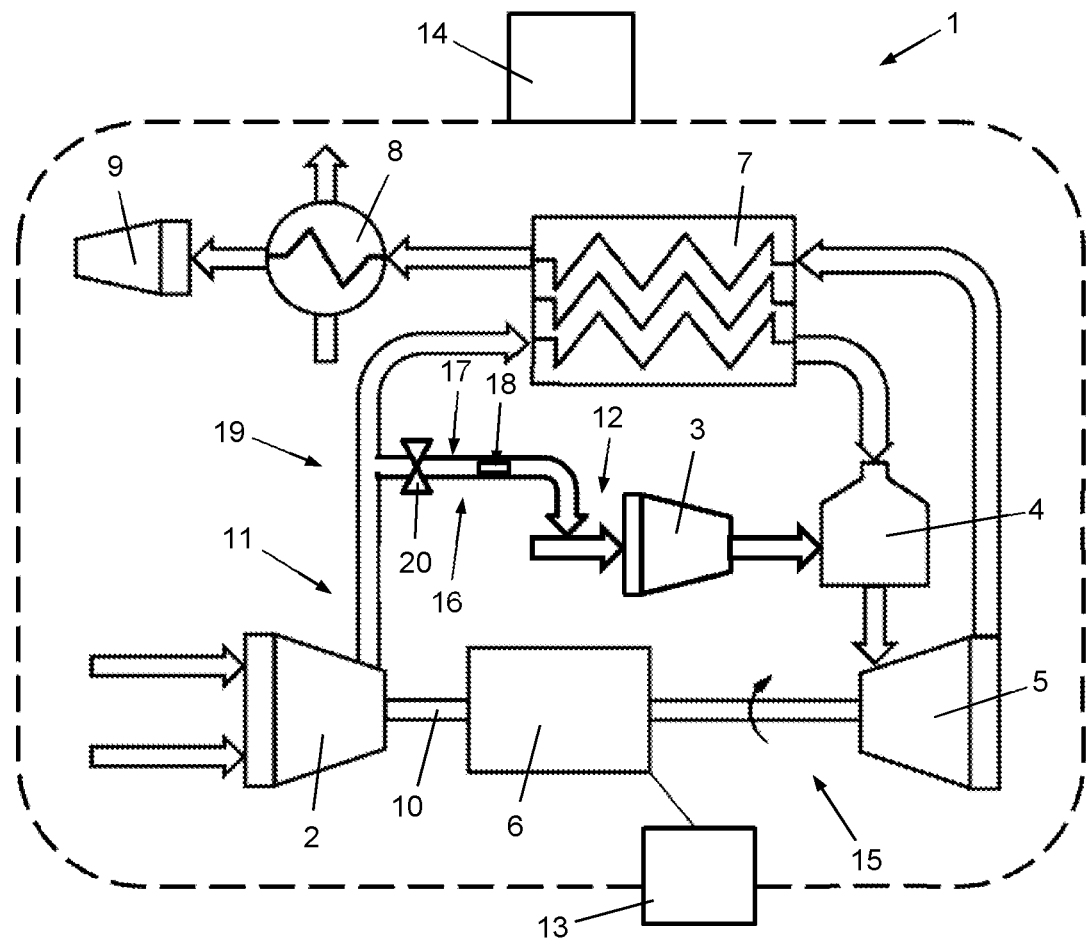
FIG. 1 shows a scheme of various components of a micro gas turbine arrangement according to the invention, including a combustor and a fuel/air supply device.

FIG. 1 shows a scheme of various components of the micro gas turbine arrangement 1, wherein fluid flows are indicated by means of large arrows. The micro gas turbine arrangement 1 may be dimensioned to generate up to 30 kW electrical power, for example, although higher electric power values are possible as well, or lower electric power values, such as about 3 kW. The micro gas turbine arrangement 1 comprises an air compressor 2, a fuel compressor 3, a combustor 4, a turbine 5, a high speed generator 6, a recuperator 7, a heat exchanger 8 and an exhaust 9. The high speed generator 6 is arranged on a common shaft 10 of the air compressor 2 and the turbine 5. When the micro gas turbine arrangement 1 is operated, air is input to the air compressor 2 and gas fuel is input to the combustor 4 in order for combustion of the gas fuel to take place, as a result of which hot gas is obtained.

The air compressor 2 acts to compress the air and to thereby pressurize the air, wherein the pressure of the air may be increased from ambient pressure to about 3 bar, for example. In a general sense, the air compressor 2 is part of a primary air supply arrangement 11 that is configured to supply the air to the combustor 4. For the purpose of conveying the air through the micro gas turbine arrangement 1, it is practical for the air supply arrangement 11 to be provided with a suitable system of air conduits.

The gas fuel may be supplied at a relatively low pressure of about 20 mbar, for example, and the fuel compressor 3 acts to compress the gas fuel and to thereby pressurize the gas fuel, wherein the pressure of the gas fuel may be increased to a value higher than 3 bar before the gas fuel is made to enter the combustor 4. A practical example of the gas fuel is natural gas. In a general sense, the fuel compressor 3 is part of a fuel supply arrangement 12 that is configured to supply the fuel to the combustor 4. For the purpose of conveying the gas fuel through the micro gas turbine arrangement 1, it is practical for the fuel supply arrangement 12 to be provided with a suitable system of fuel conduits.

The compressed air output from the air compressor 2 is supplied to the recuperator 7 where it is pre-heated under the influence of heat exchange with exhaust gas from the turbine 5. The compressed air is further heated under the influence of heat generated by the gas fuel combustion in the combustor 4. The hot pressurized gas is expanded in the turbine 5, on the basis of which mechanical power is obtained that is used for powering both the air compressor 2 and the high speed generator 6. In the process, the common shaft 10 performs a rotational movement as indicated by means of a small bent arrow in FIG. 1.

Exhaust gas from the turbine 5 is supplied to the recuperator 7 for heating compressed air from the air compressor 2, as mentioned. After having passed the recuperator 7, the gas from the turbine 5 is made to flow through the heat exchanger 8 and finally through the exhaust 9. The heat exchanger 8 has a function in heating a suitable medium such as water. Thus, output of the micro gas turbine arrangement 1 is realized at the heat exchanger 8, and also at the high speed generator 6. In respect of the latter, it is noted that the high speed generator 6 is designed to be used to generate electric current on the basis of mechanical power, and that the micro gas turbine arrangement 1 further comprises a grid converter 13 for outputting the electric current to an electric power grid (not shown).

For the purpose of controlling operation of the micro gas turbine arrangement 1, a controller 14 is provided. The controller 14 is configured to take care that all functionalities of the micro gas turbine arrangement 1 are performed in an appropriate manner so as to realize operation of the micro gas turbine arrangement 1 as envisaged. The controller 14 sets a rotational speed of the rotating assembly 15 of the air compressor 2, the turbine 5, the high speed generator 6 and the common shaft 10, and controls a supply of fuel to the combustor 4, to mention only two examples.

Besides the primary air supply arrangement 11, the micro gas turbine arrangement 1 comprises a secondary air supply arrangement 16 interconnecting the primary air supply arrangement 11 and the fuel supply arrangement 12. The entirety of the primary air supply arrangement 11, the fuel supply arrangement 12 and the secondary air supply arrangement 16 is referred to as a fuel/air supply device 19 in the micro gas turbine arrangement 1. The secondary air supply arrangement 16 includes an air conduit 17 having a restricted portion 18 of relatively small diameter, so that an area for allowing air to pass through the air conduit 17 is relatively small in the air conduit 17 at the position of the restricted portion 18. The fuel/air supply device 19 is equipped with a valve mechanism 20 that is designed to enable an operator of the micro gas turbine arrangement 1 to choose whether or not to make use of the secondary air supply arrangement 16. The valve mechanism 20 may be arranged in the air conduit 17, at a position upstream or downstream of the restricted portion 18 of the air conduit 17, whatever is appropriate and practical in a given situation.

When the micro gas turbine arrangement 1 is operated and the valve mechanism 20 is in a position of allowing an air flow through the air conduit 17 of the secondary air supply arrangement 16, a relatively large quantity of air flows to the combustor 4 through the primary air supply arrangement 11, wherein the air passes the air compressor 2 so as to be at an appropriate pressure, and wherein the air passes the recuperator 7 so as to be at an appropriate temperature, and a relatively small quantity of air flows to the fuel supply arrangement 12 through the secondary air supply arrangement 16, wherein the air passes the restricted portion 18 of the air conduit 17. In the micro gas turbine arrangement 1 as disclosed herewith, there is no need for additional measures aimed at generating the air flow in the secondary air supply arrangement 16, because the pressure at the output side of the air compressor 2 is normally higher than the pressure at the intake side of the fuel supply arrangement 12, i.e. the input side of the gas fuel compressor 3.

It is appropriate to open the secondary air supply arrangement 16 when it is desired to do so in view of the calorific value of input gas fuel. In particular, it may be so that the micro gas turbine arrangement 1 is in fact designed so as to operate on low calorific gas fuel, and that the secondary air supply arrangement 16 is used to allow the gas fuel that is input to the micro gas turbine arrangement 1 to be high calorific gas fuel. By mixing high calorific gas fuel with air supplied by the secondary air supply arrangement 16, it is possible to obtain a fuel/air mixture of appropriate low calorific value, and to ensure that a calorific value of a fuel/air mixture that is input from the gas fuel supply arrangement 12 to the combustor 4 is always in a certain range. This effect may be achieved without a need for controlling the pressure and/or the mass flow in the secondary air supply arrangement 16, as the design of the restricted portion 18 of the air conduit 17 of the secondary air supply arrangement 16 may be chosen so as ensure that an appropriate fraction of the air flow through the primary air supply arrangement 11 can be realized in the secondary air supply arrangement 16. The fraction as mentioned can be so small that the use of the secondary air supply arrangement 16 practically does not influence the functioning of the primary air supply arrangement 11 nor the functioning of the other components of the micro gas turbine arrangement 1. On the basis of the fact that the fuel supply arrangement 12 comprises a fuel compressor 3, a low pressure side is present on the fuel supply arrangement 12, which may be a key factor in automatically obtaining an appropriate air flow through the secondary air supply arrangement 16.

Figure 2:
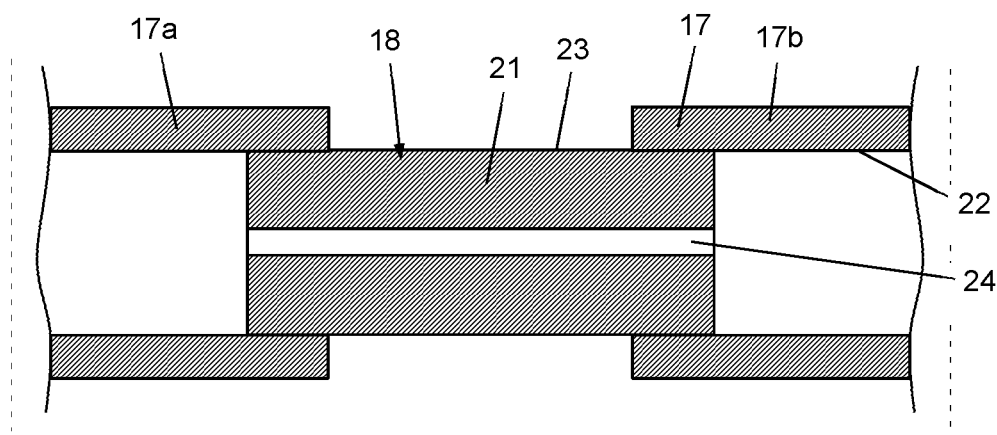
FIG. 2 shows a restricted portion of an air conduit that is part of a secondary air supply arrangement of the fuel/air supply device.

Advantageously, the restricted portion 18 of the air conduit 17 of the secondary air supply arrangement 16 is realized in an uncomplicated fashion without incurring any significant costs. For example, as illustrated in FIG. 2, a restriction element 21 may be arranged in the air conduit 17 for the purpose of having the restricted portion 18 in the air conduit 17. Such a restriction element 21 can be any suitable element that is capable of sealingly contacting an inner surface 22 of the air conduit 17 at an outer surface 23 thereof, and that has a narrow, capillary channel 24 extending therethrough. An easy method of putting the restriction element 21 in place in the air conduit 17 may comprise the steps of diving the air conduit 17 in two portions 17a, 17b, inserting an end portion of the restriction element 21 in one of the air conduit portions 17a, 17b, and inserting an opposite end portion of the restriction element 21 in another of the air conduit portions 17a, 17b, so that the configuration as illustrated in FIG. 2 is obtained.

It will be clear to a person skilled in the art that the scope of the invention is not limited to the examples discussed in the foregoing, but that several amendments and modifications thereof are possible without deviating from the scope of the invention as defined in the attached claims.

For the sake of completeness, it is noted that many practical aspects from the embodiment of the fuel combustion arrangement 1 described in the foregoing and illustrated in the figures are not essential. In the first place, it is noted in this respect that the fuel combustion arrangement 1 according to the invention does not necessarily need to be a micro gas turbine arrangement, as long as the fuel combustion arrangement 1 comes with a combustor 4 and the particular fuel/air supply device 19 that does not only comprise a fuel supply arrangement 12 and an air supply arrangement 11 but also offers a possibility of realizing an interconnected arrangement of the fuel supply arrangement 12 and the air supply arrangement 11 through an additional air supply arrangement 16. In the second place, it is not necessary for the primary air supply arrangement 11 to be equipped with an air compressor 2, although this is very practical for realizing air flows from an input side of the fuel combustion arrangement 1 to inside positions of the fuel combustion arrangement 1. In the third place, it is noted in this respect that the restricted portion 18 of the air conduit 17 of the secondary air supply arrangement 16 may be completely passive in order to avoid structural complexity, but that does not alter the fact that the secondary air supply arrangement 16 may be provided with a mechanism for varying the diameter of the air conduit 17 at the position of the restricted portion 18, for example, in which case measures are taken to realize an appropriate diameter control functionality.

The fuel/air supply device 19 according to the invention can be provided as a separate unit designed for incorporation in a larger arrangement such as a fuel combustion arrangement 1 comprising a combustor 4. In practice, it is also possible that in existing situations, a conventional fuel/air supply device is upgraded to a fuel/air supply device 19 according to the invention, namely by taking structural measures for making a direct air connection between the fuel supply arrangement and the air supply arrangement of the fuel/air supply device.

A possible summary of the invention reads as follows. A fuel/air supply device 19 comprises a fuel supply arrangement 12 designed to convey fuel from a fuel inlet of the fuel/air supply device 19 to a fuel outlet of the fuel/air supply device 19, a primary air supply arrangement 11 designed to convey air from an air inlet of the fuel/air supply device 19 to an air outlet of the fuel/air supply device 19, and a secondary air supply arrangement 16 connecting the primary air supply arrangement 11 to the fuel supply arrangement 12 at a position upstream of a fuel compressor 3 that is included in the fuel supply arrangement 12. The secondary air supply arrangement 16 includes an air conduit 17 that has a restricted portion 18 for defining a relatively small air passage in the air conduit 17, and can be used for realizing a fuel/air mixture of low calorific value if so desired on the basis of a supply of air to the fuel without needing complex control measures.

The invention claimed is:

1. A fuel/air supply device comprising:
   a fuel supply arrangement designed to convey fuel from a fuel inlet of the fuel/air supply device to a fuel outlet of the fuel/air supply device, wherein the fuel supply arrangement comprises a fuel compressor designed to take in and pressurize fuel at a position upstream of the fuel outlet of the fuel/air supply device;
   a primary air supply arrangement designed to convey air from an air inlet of the fuel/air supply device to an air outlet of the fuel/air supply device; and
   a secondary air supply arrangement interconnecting the primary air supply arrangement and the fuel supply arrangement by connecting the primary air supply arrangement to the fuel supply arrangement at a position upstream of the fuel compressor for enabling direct supply of air from the primary air supply arrangement to the fuel supply arrangement at the position upstream of the fuel compressor, wherein the secondary air supply arrangement includes an air conduit that has a restricted portion having an area for allowing air to pass through the air conduit that is relatively small compared to an area of the air conduit.

2. The fuel/air supply device according to claim 1 further comprising a valve mechanism designed to be put in one of a position of blocking an air flow through the air conduit of the secondary air supply arrangement and a position of allowing an air flow through the air conduit of the secondary air supply arrangement.

3. A fuel combustion arrangement comprising:
   a combustor designed to combust fuel; and
   the fuel/air supply device according to claim 2;
   wherein the fuel supply arrangement of the fuel/air supply device is associated with the combustor and arranged to supply fuel to the combustor; and
   wherein the primary air supply arrangement of the fuel/air supply device is associated with the combustor and arranged to supply air to the combustor.

4. The fuel/air supply device according to claim 1, wherein a diameter of the restricted portion of the air conduit of the secondary air supply arrangement is in a range of 5 to 20 times smaller than a general diameter of the air conduit.

5. The fuel/air supply device according to claim 1, wherein the secondary air supply arrangement is designed to realize an air flow in a range of 5% to 20% of the fuel volumetric flow.

6. The fuel/air supply device according to claim 1, wherein the primary air supply arrangement comprises an air compressor designed to take in and pressurize air.

7. The fuel/air supply device according to claim 1, wherein the restricted portion of the air conduit of the secondary air supply arrangement comprises a restriction element having a narrow channel extending therethrough and being arranged inside the air conduit; and wherein an outer surface of the restriction element sealingly contacts an inner surface of the air conduit.

8. The fuel/air supply device according to claim 7, wherein the air conduit is divided in two portions and the portions are associated with the restriction element at either side of the restriction element.

9. A fuel combustion arrangement comprising:
a combustor designed to combust fuel; and
the fuel/air supply device according to claim 1;
wherein the fuel supply arrangement of the fuel/air supply device is associated with the combustor and arranged to supply fuel to the combustor; and
wherein the primary air supply arrangement of the fuel/air supply device is associated with the combustor and arranged to supply air to the combustor.

10. The fuel combustion arrangement according to claim 9 further comprising a controller arrangement designed to control operation of the fuel combustion arrangement, the controller arrangement being configured to detect pressure of an air flow from the primary air supply arrangement to the combustor and to set a flow of fuel from the fuel supply arrangement to the combustor in dependency thereof by following an algorithm according to which the flow of fuel from the fuel supply arrangement to the combustor is set so as to be larger when the pressure of the air flow from the primary air supply arrangement to the combustor is higher and so as to be smaller when the pressure of the air flow from the primary air supply arrangement to the combustor is lower.

11. The fuel combustion arrangement according to claim 9 being configured as a gas turbine arrangement, wherein the combustor is designed to generate hot gas by combusting fuel; and
wherein the fuel combustion arrangement further comprises:
a turbine designed to take in and expand hot gas generated by the combustor; and
a generator mechanically coupled to the turbine and designed to generate electric power on the basis of mechanical power.

12. The fuel combustion arrangement according to claim 11 further comprising a grid converter designed to output electric power generated by the fuel combustion arrangement during operation thereof to an electric power grid.

13. The fuel combustion arrangement according to claim 11 further comprising a heat exchanger being configured and arranged to serve as a recuperator for pre-heating air in the primary air supply arrangement before being supplied to the combustor by allowing the air to exchange heat with exhaust gas from the turbine.

14. The fuel combustion arrangement according to claim 11 further comprising a heat exchanger being configured and arranged to serve for heating an external medium by allowing the external medium to exchange heat with exhaust gas from the turbine.

15. A method of controlling an effective calorific value of a fuel/air mixture to be output from a fuel/air supply device comprising a fuel supply arrangement that is designed to convey fuel from a fuel inlet of the fuel/air supply device to a fuel outlet of the fuel/air supply device, and that comprises a fuel compressor designed to take in and pressurize fuel at a position upstream of the fuel outlet of the fuel/air supply device, and the fuel/air supply device further comprising a primary air supply arrangement designed to convey air from an air inlet of the fuel/air supply device to an air outlet of the fuel/air supply device, the method comprising:

taking a fraction of air flowing through the primary air supply arrangement; and
supplying the air directly to the fuel supply arrangement at a position upstream of the fuel compressor using a secondary air supply arrangement that interconnects the primary air supply arrangement and the fuel supply arrangement by connecting the primary air supply arrangement to the fuel supply arrangement at the position upstream of the fuel compressor, and that includes an air conduit that has a restricted portion at the position of which an area for allowing air to pass through the air conduit is relatively small in the air conduit.

16. A fuel/air supply device comprising:
a fuel supply arrangement designed to convey fuel from a fuel inlet of the fuel/air supply device to a fuel outlet of the fuel/air supply device, wherein the fuel supply arrangement comprises a fuel compressor designed to take in and pressurize fuel;
a primary air supply arrangement designed to convey air from an air inlet of the fuel/air supply device to an air outlet of the fuel/air supply device; and
a secondary air supply arrangement interconnecting the primary air supply arrangement and the fuel supply arrangement by connecting the primary air supply arrangement to the fuel supply arrangement at a position upstream of the fuel compressor, wherein the secondary air supply arrangement includes an air conduit that has a restricted portion having an area for allowing air to pass through the air conduit that is relatively small compared to an area of the air conduit;
wherein one or both:
a diameter of the restricted portion of the air conduit of the secondary air supply arrangement is in a range of 5 to 20 times smaller than a general diameter of the air conduit; and
the secondary air supply arrangement is designed to realize an air flow in a range of 5% to 20% of the fuel volumetric flow.

17. The fuel/air supply device according to claim 16, wherein the restricted portion of the air conduit of the secondary air supply arrangement comprises a restriction element having a narrow channel extending therethrough and being arranged inside the air conduit; and
wherein an outer surface of the restriction element sealingly contacts an inner surface of the air conduit.

18. The fuel/air supply device according to claim 17, wherein the air conduit is divided in two portions and the portions are associated with the restriction element at either side of the restriction element.

19. A fuel combustion arrangement comprising:
a combustor designed to combust fuel;
the fuel/air supply device according to claim 16; and
a controller arrangement designed to control operation of the fuel combustion arrangement;
wherein the fuel supply arrangement of the fuel/air supply device is associated with the combustor and arranged to supply fuel to the combustor;
wherein the primary air supply arrangement of the fuel/air supply device is associated with the combustor and arranged to supply air to the combustor; and
wherein the controller arrangement is configured to detect pressure of an air flow from the primary air supply arrangement to the combustor and to set a flow of fuel from the fuel supply arrangement to the combustor in dependency thereof by following an algorithm according to which the flow of fuel from the fuel supply arrangement to the combustor is set so as to be larger when the pressure of the air flow from the primary air supply arrangement to the combustor is higher and so as to be smaller when the pressure of the air flow from the primary air supply arrangement to the combustor is lower.

\* \* \* \* \*